US011367329B2

(12) United States Patent
Liao

(10) Patent No.: US 11,367,329 B2
(45) Date of Patent: Jun. 21, 2022

(54) MONITORING METHOD FOR SHARED RECYCLABLE LOGISTICS CONTAINER AND SYSTEM THEREOF

(71) Applicant: SHANGHAI HONGYAN RETURNABLE TRANSIT PACKAGINGS CO., LTD., Shanghai (CN)

(72) Inventor: Qingxin Liao, Shanghai (CN)

(73) Assignee: SHANGHAI HONGYAN RETURNABLE TRANSIT PACKAGINGS CO., LTD, Shanghai (CN)

(*) Notice: Subject to any disclaimer, the term of this patent is extended or adjusted under 35 U.S.C. 154(b) by 0 days.

(21) Appl. No.: 16/651,873

(22) PCT Filed: Sep. 26, 2018

(86) PCT No.: PCT/CN2018/107611
§ 371 (c)(1),
(2) Date: Mar. 27, 2020

(87) PCT Pub. No.: WO2019/062761
PCT Pub. Date: Apr. 4, 2019

(65) Prior Publication Data
US 2020/0234547 A1 Jul. 23, 2020

(30) Foreign Application Priority Data

Sep. 29, 2017 (CN) .......................... 201710908308.X

(51) Int. Cl.
G08B 1/08 (2006.01)
G08B 13/02 (2006.01)
(Continued)

(52) U.S. Cl.
CPC ......... *G08B 13/02* (2013.01); *G01C 21/3407* (2013.01); *G01S 19/01* (2013.01);
(Continued)

(58) Field of Classification Search
USPC ........................................................ 340/568.1
See application file for complete search history.

(56) References Cited

U.S. PATENT DOCUMENTS 5,825,283 A * 10/1998 Camhi .................. B60R 25/102
340/438
2009/0322510 A1 * 12/2009 Berger ............... G06Q 10/0833
340/539.1

(Continued)

FOREIGN PATENT DOCUMENTS

| CN | 105554059 | 5/2016 |
| CN | 107123028 | 9/2017 |
| CN | 107181786 | 9/2017 |

OTHER PUBLICATIONS

International Search Report issued in International Application No. PCT/CN2018/107611, dated Dec. 29, 2018, 5 pages with translation.

(Continued)

*Primary Examiner* — Brent Swarthout
(74) *Attorney, Agent, or Firm* — Hamre, Schumann, Mueller & Larson, P.C.

(57) ABSTRACT

The present application relates to the field of logistics. Disclosed are a monitoring method for a shared recyclable logistics container and a system thereof, capable of timely and accurately finding a recyclable logistics container which may be stolen. In the invention, a recyclable logistics container may be time-shared by a plurality of users; a server stores valid area sets corresponding to each user, each valid area set comprising one or more geographic areas; the server continuously obtains a container identifier and positioning (Continued)

information of the recyclable logistics container; a valid area set corresponding to the current user of the recyclable logistics container is queried according to the container identifier; and if it is determined, according to the positioning information, that the recyclable logistics container camps outside the geographic areas in the found valid area set and the camping duration exceeds a predetermined threshold, an alarm is given.

11 Claims, 1 Drawing Sheet

(51) Int. Cl.
| | |
|---|---|
| *H04W 4/029* | (2018.01) |
| *G06F 16/245* | (2019.01) |
| *G01C 21/34* | (2006.01) |
| *G01S 19/01* | (2010.01) |
| *G06Q 10/08* | (2012.01) |
| *G08B 21/18* | (2006.01) |
| *G06Q 30/06* | (2012.01) |

(52) U.S. Cl.
CPC ....... *G06F 16/245* (2019.01); *G06Q 10/0833* (2013.01); *G08B 21/182* (2013.01); *H04W 4/029* (2018.02); *G06Q 30/0645* (2013.01)

(56) References Cited

U.S. PATENT DOCUMENTS

2013/0027556 A1* 1/2013 Clark ............... G08B 21/24
   348/148
2018/0041895 A1* 2/2018 Barcala ............... H04W 8/22

OTHER PUBLICATIONS

Office Action issued in Chinese Application No. 201710908308.X, dated Apr. 27, 2021, with English translation.
Extended European Search Report issued in corresponding European Application No. 18861037.2, dated Jul. 13, 2021, 9 pages.

* cited by examiner

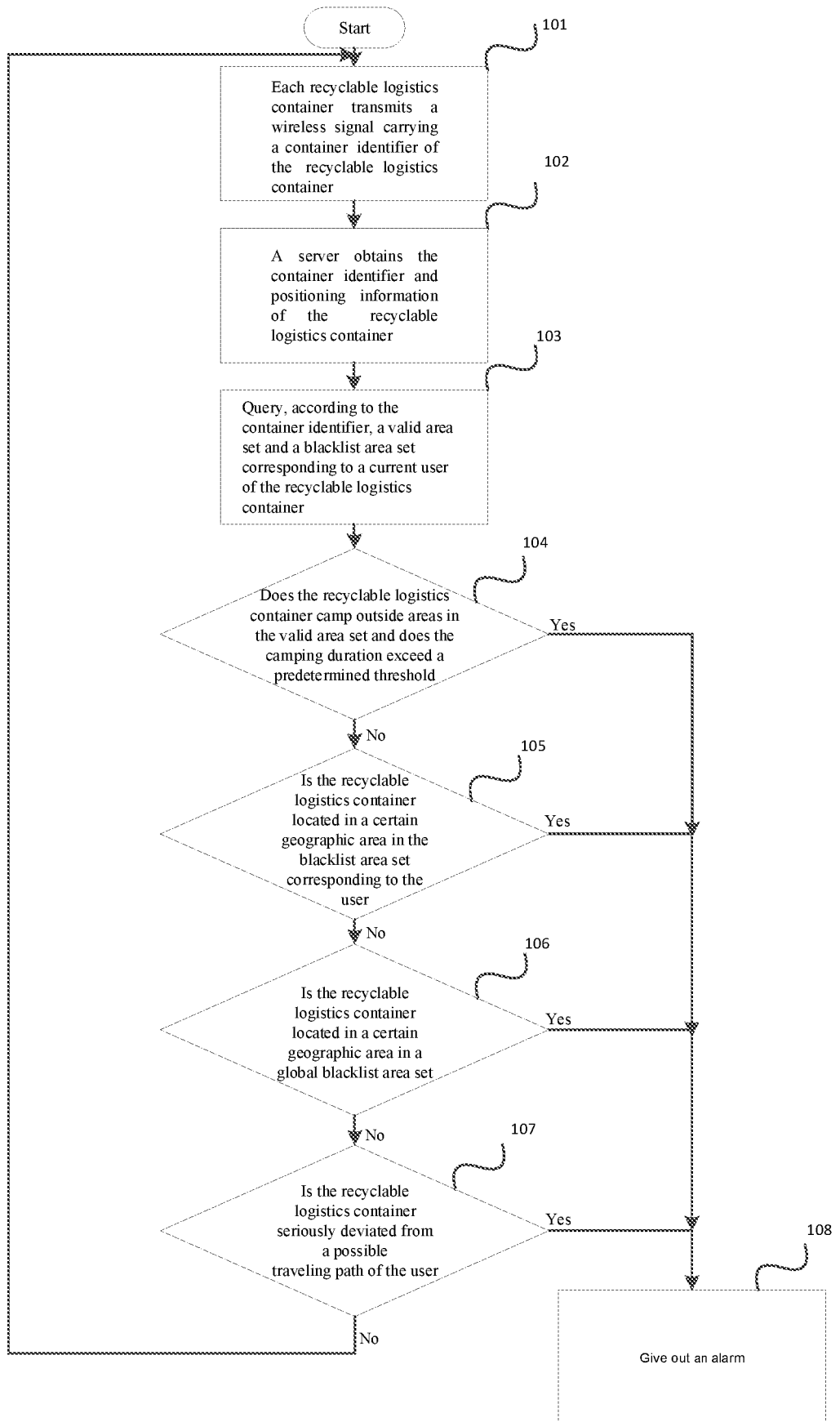

MONITORING METHOD FOR SHARED RECYCLABLE LOGISTICS CONTAINER AND SYSTEM THEREOF

FIELD OF THE INVENTION

The present invention relates generally to the fields of logistics, and, monitoring technology for shared recyclable logistics containers.

BACKGROUND OF THE INVENTION

A recyclable logistics container is a cargo carrier that can be reused. A more general model is purchased by the user and used by himself. However, most users do not always use recyclable logistics container. The recyclable logistics container can only be stacked in the warehouse, which results in storage costs, on the one hand, the rate of utilization of recyclable logistics container is also relatively low during the period of non-use.

To solve this problem, the applicant of this invention has promoted a business model of shared recyclable logistics container, wherein, one way is shared leasing, i.e., An operator purchases recyclable logistics containers and leases the recyclable logistics containers to multiple users. A user may obtain recyclable logistics containers from the operator when he needs to use it. The user may return the recyclable logistics container to the operator or directly transfer to the next user who needs to use when the user does not use it. As a result, this dramatically reduces the user's cost. Another way is to share for using, i.e., A user purchases recyclable logistics containers by himself. He may lease the recyclable logistics containers via the operator to other users when the user does not use the recyclable logistics containers. This not only saves costs, but also achieves the profits for the users.

From the perspective of the entire society, these recyclable logistics containers sharing methods have significantly improved the utilization rate of recyclable logistics containers and dramatically reduced the cost for users. However, the way of sharing also notably increases the difficulties of anti-burglary of recyclable logistics containers. Because recyclable logistics containers are constantly being used by different users, the difficulties of management have dramatically increased. The geographical scope of their use is undetermined, the way of using is variable, the logistics path is also undetermined, how to know if recyclable logistics containers are being used normally or are likely to have been stolen becomes a big problem. If the problem of anti-burglary cannot be solved well, it will dramatically restrict the implementation of the sharing mode of recyclable logistics containers.

SUMMARY OF THE INVENTION

The purpose of the present invention is to provide a monitoring method and system for shared recyclable logistics containers, which can accurately and promptly find recyclable logistics containers that may be stolen.

In order to solve the above problem, the present invention discloses a method for monitoring a shared recyclable logistics container, which includes the following steps:

A recyclable logistics container is shared by multiple users in a time-shared manner, valid area sets corresponding to each user are stored in a server, and each valid area set contains one or more geographic areas;

Obtaining continuously the container identifier and positioning information of the recyclable logistics containers by the server;

Querying the valid area set corresponding to the current user of the recyclable logistics container according to the container identifier;

Giving out an alarm, if it is determined, according to the positioning information, that the recyclable logistics container camp outside the geographic areas in the queried valid area set and the camping duration exceeds a predetermined threshold.

In a preferred example, the recyclable logistics containers comprising a wireless communication module for transmitting a wireless signal carrying a container identifier;

The step of "obtaining continuously the container identifier and positioning information of the recyclable logistics containers by the server" comprising the following sub-steps: obtaining the positioning information of the recyclable logistics container according to the wireless signal carrying the container identifier continuously transmitted by the recyclable logistics container.

In a preferred example, the step of giving out an alarm comprising the following sub-steps:

Sending alarm information to a terminal device used by the current user of the recyclable logistics container.

In a preferred example, the server further has one or more blacklist area sets which are set in advance, and each blacklist area set contains one or more geographic areas The step of "obtaining continuously the container identifier and positioning information of the recyclable logistics containers by the server" further includes the following steps:

Giving out an alarm, if it is determined, according to the positioning information, that the recyclable logistics container is in any geographic area in the blacklist area set.

In a preferred example, the valid area set is set in the following manner:

The server continuously obtains the container identifier and positioning information of the recyclable logistics container, wherein the positioning information includes a geographic position and a positioning time;

Querying the current user corresponding to the container identifier according to the container identifier which corresponding to the positioning information, to establish a correspondence relationship between the positioning information and the current user;

Establishing a geographic area set for each user respectively by collecting the positioning information corresponding to the same user; In each geographic area of the geographic area set, at least once, the user's recyclable logistics container having a camping duration which is exceeds a predetermined threshold in the geographic area.

In a preferred example, the step of "Obtaining continuously the container identifier and positioning information of the recyclable logistics containers by the server" thereafter, further comprising the following step:

Obtaining a possible travelling path corresponding to the current user of the recyclable logistics container according to the container identifier by the server;

Giving out an alarm, if the positioning information is deviates from the possible travelling path by more than a predetermined threshold.

In a preferred example, the possible travelling path corresponding to the current user is calculated according to location points in the current user's valid area set combined with a geographic information system.

In a preferred example, the possible travelling path which corresponding to the current user is a historical travelling path of the current user.

The present invention also discloses a shared monitoring system for recyclable logistics containers, comprising a server and a plurality of recyclable logistics containers shared by multiple users in a time-shared manner;

The server comprises:

A storage unit, configured to store valid area sets corresponding to each user, and each valid area set includes one or more geographic areas;

An acquisition unit, configured to continuously obtain the container identifier and positioning information of the recyclable logistics container;

A query unit, configured to query the valid area set corresponding to the current user of the recyclable logistics container according to the container identifier;

A judgment unit, configured to give out an alarm, if it is determined, according to the positioning information, that the recyclable logistics container camp outside the geographic areas in the queried valid area set and the camping duration exceeds a predetermined threshold.

In a preferred example, the recyclable logistics container comprising a wireless communication module and a positioning module;

The positioning module, configured to positioning the recyclable logistics container and outputting the positioning information;

The wireless communication module, configured to transmit a wireless signal carrying the container identifier and the positioning information output by the positioning module.

In a preferred example, the storage unit further stores one or more blacklist area sets, and each blacklist area set contains one or more geographic areas;

The judgment unit further configured to give out an alarm if it is determined that the recyclable logistics container is in any geographic area in the blacklist area set according to the positioning information.

In a preferred example, the server further comprising a valid area generating module configured to querying the current user corresponding to the container identifier corresponding to the positioning information obtained by the acquisition unit, to establish the correspondence relationship between positioning information and the current user; establishing a geographic area set for each user respectively by collecting the positioning information corresponding to the same user; wherein, in each geographic area of the geographic area set, at least once, the user's recyclable logistics container having a camping duration which is exceeds a predetermined threshold in the geographic area.

Compared with the prior art, the embodiments of the present invention have at least the following differences and effects:

Even if the recyclable logistics container is rented by a number of different users within a certain period of time, even if the user does not report the destination and transportation plan of the management promptly, even if the transportation path is selected by the logistics company is completely unknown, it may still be found accurately and promptly recyclable logistics containers that may be stolen.

Many technical features are described in the specification of this invention, and they are distributed in various technical solutions. If all possible combinations of technical features (i.e., technical solutions) are to be listed, the description will be too verbose. In order to avoid this problem, the technical features disclosed in the above summary of the present invention, the technical features disclosed in the following embodiments and examples, and the technical features disclosed in the drawings can be freely combined with each other to constitute various new technical solutions (these technical solutions are considered to have been recorded in this specification), unless such a combination of technical features is not technically feasible. For instance, feature A+B+C is disclosed in one example, feature A+B+D+E is disclosed in another example, and features C and D are equivalent technical means that play the same role. It can be used once, and it is impossible to adopt both at the same time. Feature E can be technically combined with feature C. Then, the solution of A+B+C+D should not be considered as recorded because the technology is not feasible, and A+B+the C+E plan should be considered documented.

BRIEF DESCRIPTION OF THE DRAWINGS

FIG. 1 is a schematic flowchart of a method for monitoring a shared recyclable logistics container according to a first embodiment of the present invention.

DETAILED DESCRIPTION

In the following description, many technical details are proposed in order to make the reader better understand this invention. However, those of ordinary skill in the art can understand that even without these technical details and various changes and modifications based on the following embodiments, the technical solution claimed in this invention can be implemented.

Explanation of Some Concepts:

The "server" indicates that a computer system in the network that can provide certain services to other machines. The objects of server services are usually referred to as clients. The server and the client can be connected through wired or wireless communication. In the embodiments of the present invention, the server may be only one computer, or a logical server system composed of multiple computers with different functions, or a computer system composed of a computer and an external device such as an external storage device. It may also be a computer cluster or a cloud server or the like.

The "recyclable logistics container" indicates that reusable logistics containers, which can be loaded with solid or liquid substances, and can also be packed with packed gaseous substances. Typically, after the empty state of recyclable logistics container is transported to the shipper, the goods are loaded in it, and then the full state of the recyclable logistics container is transported to the receiver, the goods in it are unloaded, and the recyclable logistics container which the empty state is restored may be reused again.

The "correspondence relationship" indicates that the correspondence relationship between two or more data, which is usually stored in a storage device or storage device. The storage device or storage device may be a database, file, hard disk, memory, etc.

The "camping": it indicates that recyclable logistics containers appear in a small area for a long time, and there is basically no obvious movement, or the position within a certain period of time are concentrated in a certain radius area. Certainly, a reasonable positioning error should be considered according to different positioning methods when judging.

The "sharing" indicates that the sharing and mixed use of recyclable logistics containers. It may be the sharing among different enterprises through the leasing model, but it may also be the sharing (mixed use) of recyclable logistics containers through respective procurement. Because the recyclable logistics container purchased by everyone is standardized, it can be mixed used among enterprises.

The "time-shared" indicates that the same recyclable logistics container is used by different users at different times, i.e., the right to use the recyclable logistics container is time-multiplexed.

The "GPS" indicates that Global Position System.

Some of the innovations of this invention are briefly shown below:

It is difficult to judge a shared recyclable logistics container was stolen and to give a timely alarm. The first difficulty is that the recyclable logistics container is shared and used by multiple users in a time-shared manner, and its range of movement may be relatively large. It is difficult to judge whether it is stolen based on the positioning information. The second difficulty is that it is difficult to judge whether the recyclable logistics container is on a reasonable path. On one hand, due to traffic jams and other reasons, logistics companies may flexibly choose multiple transport paths for transportation. The choice of transport path is often beyond the control of user of the recyclable logistics container. Even if the user knows the current location of the recyclable logistics container, it is difficult to tell whether the recyclable logistics container was during normal shipping or has been stolen. On the other hand, for the management party of the recyclable logistics container, when the recyclable logistics container is leased to the user thereafter, the management party may not be able to promptly know the user's specific destination (the user's transportation plan is not obliged to report to the management party promptly), so it is even impossible to estimate a reasonable path.

A valid area set can be set for each possible leasing user in advance by the server of the management party. After positioning the recyclable logistics container, find the current user of the recyclable logistics container, and then find the valid area set corresponding to the current user, and then determine whether the recyclable logistics container is in the valid area set. If it is in the valid area set, it is considered that the recyclable logistics device is not currently stolen. If it is not in the valid area set, further judge whether the recyclable logistics container camps outside the valid area for a long time (i.e., the camping duration exceeds a predetermined threshold). If so, the recyclable logistics device is considered to have the possibility of being stolen, and the user or the operator is alerted by the server of the management party. If it is still in a moving state although it is outside the valid area, continue to observe and do not report the alarm temporarily. Through this technical solution, even if the recyclable logistics container is rented by multiple different users within a certain period of time (that is, for the same recyclable logistics container, there are different sets of valid areas in different periods; optionally, the same user may also be possible to set different sets of valid areas at different times) even if the user does not report the destination and transportation plan of the management promptly, even if the transportation path selected by the logistics company is completely unknown, it is still possible to find the recyclable logistics containers that may be stolen in a prompt and accurate manner. Although the technical solution in this invention was originally designed for anti-burglary, it can also be used for alarming for other purposes.

In the case of many users, it is difficult to require each user to accurately and promptly set up all legal geographic areas. To solve this problem, the inventor has designed an automated method to identify and set valid area sets. Within the initial period of use of a new user, each recyclable logistics container used by the new user is tracked, but does not trigger any alarm. After the data is accumulated for a period, the data is analyzed to find all geographic areas that have camped for a long time, and these geographic areas are configured as a set of legal regions automatically. Optionally, all the movement paths that a recyclable logistics container has ever used may be find as legal geographic areas. With this technical solution, the user can enjoy the service of anti-burglary alarm without any manual operation, which making the technical solution of the present invention easier to implement.

Optionally, a blacklist area set may be set for each user. After receiving the positioning information, the current user is queried according to the container identifier which corresponding to the positioning information, so as to obtain the blacklist area set of the user. If the positioning Information falls in any geographic area of the blacklist area set, an alarm is given in time. A global blacklist area set can also be provided separately or simultaneously, and if the received positioning information falls in any geographic area of the blacklist area set, an alarm is promptly given out.

Optionally, one of the embodiments of the specification further includes monitoring of the path. Several position points can be set in the user's valid area set. These position points are the departure point or the arrival point of the recyclable logistics container, such as the gate of each factory or warehouse. According to these position points, several most probable paths can be planned in combination with the electronic map, and these paths are all legal paths. The historical movement trajectory of the recyclable logistics container for the same user can also be collected, and the historical trajectory can be used as a legal path. In this way, the legal path can be automatically set. If the current positioning information of the recyclable logistics container is not in the valid area set, and obviously deviates from these legal paths (the distance from the nearest legal path exceeds a predetermined threshold), an alarm is given out.

To make the objectives, technical solutions, and advantages of the present invention clearer, the embodiments of the present invention will be described in further detail below with reference to the accompanying drawings.

The first embodiment of the present invention relates to a monitoring method for a shared recyclable logistics container. FIG. 1 is a schematic flowchart of a monitoring method of the shared recyclable logistics container.

A recyclable logistics container is shared by multiple users in a time-shared manner. The server stores valid area sets corresponding to each user (it may be the empty set if there is no use), and each valid area set contains one or more geographic areas. Optionally, the server may further store blacklist area sets respectively corresponding to one or more users. Optionally, the server may further store a globally public blacklist area set.

A wireless communication module is provided in each recyclable logistics container for continuously transmitting wireless signals carrying the container identifier. This wireless communication module may be a communication standard such as 4G, 5G, WIFI, or Bluetooth etc., and there is no limitation in this invention.

The monitoring method includes the following steps:

In step 101, each recyclable logistics container continuously transmits wireless signals with its own container identifier.

Thereafter, the process proceeds to step 102, and the server obtains continuously the container identifier and positioning information of the recyclable logistics containers.

Thereafter, the process proceeds to step 103, and the server queries the valid area set corresponding to the current user of the recyclable logistics container according to the container identifier. Optionally, the blacklist area set corresponding to the current user of the recyclable logistics container can also be queried simultaneously according to the container identifier.

Thereafter, the process proceeds to step 104. In the server, if it is determined that the recyclable logistics container has camped outside the geographic areas in the queried valid area set and the camp time exceeds a predetermined threshold according to the positioning information, the process proceeds to step 108 for giving out an alarm.

Thereafter, the process proceeds to step 105. In the server, if it is determined that the recyclable logistics container is located in a certain geographic area in the blacklist area set corresponding to the user, according to the positioning information, the process proceeds to step 108 for giving out an alarm. This step is optional.

Thereafter, the process proceeds to step 106. In the server, if it is determined that the recyclable logistics container is located in a certain geographic area of the global blacklist area set, according to the positioning information, the process proceeds to step 108 for giving out an alarm. This step is also optional.

Thereafter, the process proceeds to step 107, and the server obtains a possible travelling path corresponding to the current user of the recyclable logistics container according to the container identifier; if the positioning information deviates from the closest possible travelling path by more than a predetermined threshold, the process proceeds to step 108 for giving out an alarm. This step is also optional.

The execution order of the above steps 104 to 107 can be arbitrarily arranged.

With the above technical solution, even if the recyclable logistics container is leased by a plurality of different users within a certain period of time, even if the user does not report the destination and transportation plan of the management party promptly, even if the transportation path selected by the logistics company is completely unknown, recyclable logistics container that may be stolen can still be found in a prompt and accurate manner.

Some implementation details and variations are described in detail below.

In step 102, the server obtains positioning information in a variety of ways: Option 1. A satellite positioning module (such as a GPS module, a BOE module, a Galileo satellite navigation module, etc.) is provided in the recyclable logistics container, and outputting the positioning information of recyclable logistics container, and then sending to the server on the network side through the wireless communication module in the recyclable logistics container. Option 2: There is a cellular wireless communication module in the recyclable logistics container. When the cellular wireless communication module is registered to a base station, the position of the base station is regarded as approximate positioning information of the recyclable logistics container. Option 3: There is a wireless receiving module in the recyclable logistics container, such as a WIFI module. The wireless receiving module detects nearby WIFI wireless signals, reports the detected WIFI base station identifier and the corresponding WIFI wireless signal strength to the network side through the wireless communication module in the recyclable logistics container. The network side calculates the positioning information of the recyclable logistics container based on received information. Option 4, there is a wireless transmitting module (such as a Bluetooth module) in the recyclable logistics container, which is configured to transmit the wireless signal carrying the container identifier. If a mobile terminal (such as a smart phone) receives this wireless signal, the container identifier is reported to the network side together with the location information of the mobile terminal itself as the positioning information of the recyclable logistics container. Option 5, indirectly obtaining the position of the recyclable logistics container according to the position of the transportation means carrying the recyclable logistics container. Wherein, the option 2 and 4 do not carry a positioning module, and only obtain the positioning information of the recyclable logistics container based on the wireless signals with the container identifier continuously transmitted by the recyclable logistics container.

In step 101 and step 102, there are a variety of ways for continuous transmission and continuous acquisition: Optionally, the wireless communication module of the recyclable logistics container periodically transmits wireless signals. Optionally, the wireless communication module of the recyclable logistics container transmits a wireless signal when a pre-designed trigger condition is satisfied. Optionally, the server sends an instruction for obtaining positioning information to the recyclable logistics container when necessary, and the recyclable logistics container carries the container identifier and positioning information in the returned message.

There are a variety of ways to implement to give out an alarm: optionally, the alarm information is sent to the terminal device used by the current user of the recyclable logistics container. Optionally, the alarm information is recorded in a database for future inquiry. Optionally, an alarm message is displayed on the administrator's computer. Optionally, alarm information is sent to the smart phone of the designated person. Optionally, a sound and light alarm is given out at the monitoring center. Optionally, an alarm is first given out on the terminal device of the operator, and the employees of the operator confirm the alarm information before sending the alarm information to the terminal device used by the user.

Optionally, the blacklist area set is shared by multiple users, as long as the user enters the geographic area corresponding to the blacklist area set, an alarm is given out.

Optionally, each user is provided with its own blacklist area set respectively. When the blacklist area determination is carried out, the current user of the recyclable logistics container is first queried, then blacklist area set of the current user is acquired, and then judging whether the recyclable logistics container is located in a geographic area in the blacklist area set according to the positioning information.

Optionally, it is possible to set a blacklist area set shared by multiple users or even all users simultaneously, and set up their own blacklist area set for some or all users at the same time, as long as recyclable logistics containers appear in the set of shared blacklist areas or in the current user's own blacklist area set, the alarm will be given out.

There are also a variety of ways to set the valid area set: Optionally, the user can set his own valid area set, such as selecting multiple geographic areas on an electronic map or selecting the names of multiple places, and saving them on the server. Optionally, the operator's administrator sets its valid area set for one or more users. Optionally, an automatic setting method is adopted, specifically: the server continuously obtains the container identifier and positioning information of the recyclable logistics container, wherein the positioning information includes a geographic position and a positioning time. Querying the current user corresponding to the container identifier based on the positioning information corresponding to the container identifier, to establish the correspondence relationship between the positioning information and the user. Counting the positioning information corresponding to the same user, and establishing a geographic area set for each user respectively. In each geographic area of the geographic area set, at least once, the user's recyclable logistics containers having camping duration which is exceeds a predetermined threshold in the geographic area.

In step 107, there are various methods for judging that the positioning information deviates from a possible travelling path that exceeding a predetermined threshold: optionally, each possible travelling path is a line, and finding the path closest to the current position of the recyclable logistics container, and the calculation is performed as to whether the distance between the current position of the recyclable logistics container and the closest point on the nearest path exceeds a predetermined threshold. Optionally, each possible travelling path is extended outward by a certain distance, and each travelling path is changed from a line to a belt-shaped area. If the current position of the recyclable logistics container is not in the belt-shaped area (it is not in valid area set simultaneously), it is considered that the deviation from the possible travelling path exceeds a predetermined threshold and an alarm is given out.

In step 107, there are a variety of methods for obtaining the possible travelling path corresponding to the current user: Optionally, the user may set one or more travelling paths in advance as the possible travelling path corresponding to the user. Optionally, an administrator of the operator sets one or more travelling paths for the user in advance as possible travelling paths corresponding to the user, according to the needs of the user.

Optionally, a plurality of position points are set in the valid area set of each user, and as a legal starting point or destination, a possible travelling path can be planned by through these position points in conjunction with an electronic map. If there are multiple paths for the same starting point and destination, these paths are considered as possible travelling paths, i.e., it is legal to drive on any of these paths. Optionally, the possible travelling path corresponding to the current user is a travelling path used in the history of the user. Specifically, as a production-oriented or distribution-type enterprise, a user usually uses a relatively limited number of travelling paths. As long as a certain amount of time is accumulated, almost all legal travelling paths of the user can be obtained. If driving on these paths, it belongs to a valid area, if it deviates dramatically from these paths; it belongs to an invalid area and gives out an alarm. After receiving the alarm, if the user confirms that it is a new legal path, the system can be notified to add this travelling path to the set of legal travelling paths to become a member of the valid area set after the current driving is completed.

The second embodiment of the present invention relates to a monitoring system for a shared recyclable logistics container. The monitoring system of the shared recyclable logistics container includes a server and a plurality of recyclable logistics containers shared by a plurality of users in a time-shared manner.

The server comprises: a storage unit for storing valid area sets corresponding to each user, and each valid area set includes one or more geographic areas. Optionally, the storage unit further stores one or more blacklist area sets, and each blacklist area set includes one or more geographic areas.

an acquisition unit, configured to continuously obtain the container identifier and positioning information of the recyclable logistics container.

A query unit, configured to query the valid area set corresponding to the current user of the recyclable logistics container according to the container identifier.

A judgment unit, configured to determine whether to report an alarm according to the positioning information. There may be various conditions for determination: optionally, if it is determined that the recyclable logistics container has camped outside the geographic areas in the set of queried valid areas and the camping duration exceeds a predetermined threshold, an alarm is given out. Optionally, if it is determined that the recyclable logistics container is located in any geographic area in the blacklist area set, an alarm is given out.

A valid area generating module (optional), configured to query the current user corresponding to the container identifier corresponding to the positioning information obtained by the acquisition unit, so as to establish the correspondence relationship between the positioning information and the current user, and corresponding positioning information for the same user is performed statistics to establish a geographic area set for each user. In each geographic area of the geographic area set, at least once, the user's recyclable logistics containers have camped in the geographic area for longer than a predetermined threshold.

The recyclable logistics container includes wireless communication module and optional positioning module.

The positioning module is configured to position the recyclable logistics container and output positioning information.

The wireless communication module is configured to transmit a wireless signal with the container identifier and positioning information output by the positioning module.

The first embodiment is a method embodiment corresponding to this embodiment, and this embodiment can be implemented in cooperation with the first embodiment. Relevant technical details mentioned in the first embodiment are still valid in this embodiment, and in order to reduce repetition, details are not repeated here. Accordingly, the related technical details mentioned in this embodiment can also be applied in the first embodiment.

It should be noted that each unit mentioned in the embodiments of each device of the present invention is a logical unit. Physically, a logical unit may be a physical unit, or a part of a physical unit, or multiple physical units. The combination of the multiple physical units can be implemented as well, the physical implementation of these logical units themselves is not the most important, and the combination of the functions implemented by these logical units is the key to solve the technical problem proposed by the present invention. In addition, in order to highlight the innovative part of the present invention, the above-mentioned device embodiments of the present invention do not introduce units that are not closely related to solve the technical problems proposed by the present invention, which does not indicate that there are no other existing device embodiments.

The method embodiments of the present invention can be implemented in software, hardware, firmware, and the like. Regardless of whether the present invention is implemented in software, hardware, or firmware, the instruction code can be stored in any type of computer-accessible memory (For instance, permanent or modifiable, volatile or nonvolatile, solid state or non-solid, fixed or replaceable media, etc.). Similarly, the memory may be, for instance, Programmable Array Logic (PAL), Random Access Memory (RAM), Programmable Read Only Memory (PROM)"), Read-Only Memory ("ROM"), Electrically Erasable Programmable ROM ("EEPROM"), magnetic disks, optical disks, Digital Versatile Discs, "DVD" for short) and the like.

It should be noted that in the invention documents of this patent, relational terms such as first and second are used only to distinguish one entity or operation from another entity or operation, and do not necessarily require or imply these. There is any such actual relationship or order between entities or operations. Moreover, the terms "including/comprising", "containing", or any other variant indicate to nonexclusive covering, thus the process, method, article or equipment including a series of elements not only includes those elements, but also includes other elements which are not definitely listed, or inherent elements of this process, method, article or equipment. Without more limitations, the element defined by the phrase "include a" does not exclude additional same elements existing in the process, method, article or equipment of this element. In the invention document of this patent, if it is mentioned that an action is performed according to an element, it means that the action is performed at least based on the element, which includes two cases: performing the action based on the element only, and according to the element and the other elements perform the action. Multiple, multiple times, and various expressions include two, twice, two types, and more than two, twice or more, and two types or more.

All documents mentioned in this invention are incorporated by reference in this invention, as if each document were individually incorporated by reference. In addition, it should be understood that after reading the above-mentioned teaching content of this invention, those skilled in the art can make various changes or modifications to this invention, and these equivalent forms also fall within the scope of protection claimed by this invention.

What is claimed is:

1. A monitoring method for a shared recyclable logistics container,
   wherein a recyclable logistics container is shared by multiple users in a time-shared manner, and
   valid area sets corresponding to each user of the recyclable logistics container are stored in a memory of a server, and each valid area set is defined by one or more geographic areas; the method comprising:
   at the server, continuously obtaining a container identifier and positioning information of the recyclable logistics container;
   at the server, querying the valid area sets to obtain a valid area set corresponding to a current user of the recyclable logistics container according to the container identifier;
   giving out an alarm, if it is determined at the server, according to the positioning information, that the recyclable logistics container is outside the geographic areas in the queried valid area set and a camping duration of the recyclable logistics container outside the geographic areas in the queried valid are set exceeds a predetermined threshold.

2. The monitoring method for a shared recyclable logistics container according to claim 1, wherein the recyclable logistics container comprises a wireless communication module for transmitting a wireless signal carrying a container identifier; the method further comprising:
   continuously obtaining the container identifier and positioning information of the recyclable logistics containers by the server comprises: obtaining the positioning information of the recyclable logistics container according to the wireless signal carrying the container identifier continuously transmitted by the recyclable logistics container.

3. The monitoring method for a shared recyclable logistics container according to claim 1, wherein giving out an alarm comprises sending alarm information to a terminal device used by the current user of the recyclable logistics container.

4. The monitoring method for a shared recyclable logistics container according to claim 1, wherein:
   the server further has one or more blacklist area sets which are set in advance,
   each blacklist area set contains one or more geographic areas, and
   obtaining continuously the container identifier and positioning information of the recyclable logistics containers by the server comprises giving out an alarm, if it is determined, according to the positioning information, that the recyclable logistics container is in any geographic area in the blacklist area set.

5. The monitoring method for a shared recyclable logistics container according to claim 1, wherein the valid area set is set in the following manner:
   the server continuously obtaining the container identifier and positioning information of the recyclable logistics container, wherein the positioning information includes a geographic position and a positioning time;
   establishing a correspondence relationship between the positioning information and the current user;
   establishing a geographic area set for each user of the multiple users respectively by collecting the positioning information corresponding to said user of the multiple users; wherein the geographic area set is based on each geographic area where a camping duration of the recyclable logistics container in the geographic area exceeds a predetermined threshold.

6. The monitoring method for a shared recyclable logistics container according to claim 1, wherein continuously obtaining the container identifier and positioning information of the recyclable logistics containers by the server further comprises:
   obtaining, by the server a possible travelling path corresponding to the current user of the recyclable logistics container according to the container identifier; and
   giving out an alarm, if the positioning information has deviated from the possible travelling path by more than a predetermined threshold.

7. The monitoring method for a shared recyclable logistics container according to claim 6, wherein the possible travelling path corresponding to the current user is calculated according to location points in a valid area set for the current user.

8. The monitoring method for a shared recyclable logistics container according to claim 6, wherein the possible travelling path corresponding to the current user is a historical travelling path of the current user.

9. A monitoring system for shared recyclable logistics containers, comprising a server and a plurality of recyclable logistics containers shared by multiple users in a time-shared manner;
   the server configured to:
   store valid area sets corresponding to each user, and each valid area set includes one or more geographic areas;

continuously obtain a container identifier and positioning information of a recyclable logistics container of the plurality of recyclable logistics containers;

query the stored valid area sets to obtain a valid area set corresponding to a current user of the recyclable logistics container according to the container identifier; and give out an alarm, if it is determined, according to the positioning information, that a camping duration of the recyclable logistics container outside the geographic areas in the queried valid area set exceeds a predetermined threshold, wherein the recyclable logistics container comprises a wireless communication module and a positioning module;

the positioning module configured to determine position information for the recyclable logistics container and outputting the positioning information;

the wireless communication module, configured to transmit a wireless signal carrying the container identifier and the positioning information output by the positioning module.

10. The monitoring system of shared recyclable logistics containers according to claim 9, wherein the server is further configured to store one or more blacklist area sets, and each blacklist area set contains one or more geographic areas; and the server is further configured to give out an alarm if it is determined, according to the positioning information, that the recyclable logistics container is in any geographic area in the blacklist area set.

11. The monitoring system of shared recyclable logistics containers according to claim 9, wherein the server is further configured to establish a correspondence relationship between positioning information and the current user;

establish a geographic area set for each user respectively by collecting the positioning information corresponding to the same user;

wherein the geographic area set is based on each geographic area where a camping duration of the recyclable logistics container in the geographic area exceeds a predetermined threshold in the geographic area.

* * * * *